FIG. 3

INVENTOR.
FRANK W. ARMSTRONG
OTIS R. CARPENTER
BY
ATTORNEY

FIG. 4

INVENTOR.
FRANK W. ARMSTRONG
OTIS R. CARPENTER
BY
ATTORNEY

Oct. 16, 1962     O. R. CARPENTER ETAL     3,059,099
TUBE PANEL WALL WELDING USING A PAIR OF OPPOSITE
POLARITY ELECTRODES Filed June 2, 1958                                                         6 Sheets-Sheet 5

INVENTOR.
FRANK W. ARMSTRONG
BY OTIS R. CARPENTER

ATTORNEY

*INVENTOR.*
*FRANK W. ARMSTRONG*
BY *OTIS R. CARPENTER*

*ATTORNEY*

United States Patent Office 3,059,099
Patented Oct. 16, 1962

3,059,099
TUBE PANEL WALL WELDING USING A PAIR OF OPPOSITE POLARITY ELECTRODES
Otis R. Carpenter and Frank W. Armstrong, Barberton, Ohio, assignors to The Babcock & Wilcox Company, New York, N.Y., a corporation of New Jersey
Filed June 2, 1958, Ser. No. 739,293
7 Claims. (Cl. 219—137)

This invention relates to integrated multiple tube heat exchanger panels and, more particularly, to a novel method of and apparatus for fabricating such panels by simultaneously electric arc fusion welding opposite edges of relatively elongated metal webs disposed between adjacent tubes to such adjacent tubes in a rapid efficient manner to unite all the tubes and webs into an integral multi-tube panel.

In the construction and erection of modern vapor generators and other forms of heat exchangers, there is a pronounced trend toward the use of pre-fabricated integral tube panels. As these panels are fabricated in the shop, shipped to the erection site as a unit, and erected as a unit, there is a very considerable saving in fabrication and erection costs as compared to the known practice of shipping individual tubes to the erection site and then assembling these tubes into a tube wall.

Panel walls of this type comprise a plurality of laterally spaced, parallel and relatively elongated metal tubes united into an integral assembly by relatively elongated metal ligaments or webs interposed between adjacent tubes and fused thereto. Before assembly into panels, the tubes may be deformed to provide any required openings in the panels, such as for burners, soot blowers, access openings, etc.

An advantage of shop fabrication of the panels is that the welded joints can be made by the usual automatic or semi-automatic welding equipment and with the tubes in the best position for satisfactory welding. Additionally, the welds can be more readily inspected and correction of defects is facilitated. Readily available shop equipment may be used for inspection, stress-relieving, and other necessary operations. All this is in contrast to the difficulties and expense involved in field welding, inspection, defect correction, stress-relieving, and assembling of tubes into walls.

However, there are some problems incidental to weld uniting the tubes into an integral panel. The principal problem is that of heat induced distortion tending to warp or bend the tubes and thus distort the panel. Prevention or control of such distortion requires special provisions as to tube clamping and welding sequences which seriously increase the cost of production operation. These problems, which are more pronounced with the electric arc fusion welding techniques generally used for panel fabrication, have to some extent mitigated the advantages of shop fabrication.

For example, in electric arc fusion welding an edge of an elongated metal web or spacer to a juxtaposed metal tube, a fusible metal electrode, connected to one terminal of a source of welding current, is advanced along the seam between the workpieces which are connected to the other terminal of the source. For practical reasons, particularly because of the relatively high current involved in such fusion welding, a rolling or traveling connection between the workpieces and the welding source is not feasible, and the ground or return connection is welded or brazed to a fixed point on the workpieces or the supporting jig. Thus, as the fusible electrode traverses the work, the length, and frequently the direction, of the ground current or return current path is continually changing with resultant change in its effective impedance. With a heavy welding current, this results in substantial variation in the voltage drop in the welding circuit.

While the deleterious effects of this variation in the ground path are present in alternating current arc fusion welding of elongated seams, they are accentuated when fusion welding with direct current, which is preferred to A.C. welding due to the much higher welding speed attainable. In direct current arc welding, the magnetic effects and the change in length and direction of the ground current path through the work combine to produce an unstable arc, particularly where relatively high current densities are employed.

In addition to the foregoing problems in fusion welding such panels, there is the additional problem of distortion, particularly in a direction parallel to the general plane of the panel, due to the high localized heating followed by rapid cooling characteristics of electric arc fusion welding. Such distortion is particularly pronounced when fusion welding one edge of the spacer strip at a time to the adjacent tube. The high heat input to only one side of the strip causes this side to expand to curve or bow the strip in the general plane of the panel. Prevention or correction of this distortion by mechanical means by counter-action in subsequently fusion welding the other side of the strip to its adjacent tube is only partly satisfactory as a solution of the problem and, in any event, increases the cost and complications of the tube panel fabricating operation.

It is possible to avoid or counteract this distortion of the web by simultaneously welding both sides of the web to the adjacent tubes. However, the problem of magnetic blow is accentuated when a pair of fusible electrodes are used in direct current fusion welding closely adjacent seams or grooves as in the case of simultaneously or concurrently fusion welding both side edges of a narrow web or strip to adjacent tube walls. In addition, if the two arcs are connected in parallel to the same polarity side of the welding current source, the like polarity arcs tend to repel each other.

In accordance with the present invention, it has been found that all of the foregoing difficulties in electric arc fusion welding of tube panels can be eliminated and both side edges of each separator web or strip concurrently or simultaneously welded to the walls of adjacent tubes in a rapid and efficient manner. This is done by using the welding system of the copending application of F. W. Armstrong, Serial No. 701,809, filed December 10, 1957, now U.S. Patent No. 2,911,517. In this system, fusion is accomplished by connecting each arc to a separate source of substantially constant potential direct current with each source having one terminal connected to an electrode and the other terminal connected to a common junction at the workpiece, one electrode being negative relative to the work (straight polarity) and the other electrode being positive relative to the work (reverse polarity).

With this arrangement of the electrodes, the ground current is very substantially reduced with corresponding reduction in the magnetic blow due to ground current. As the two arcs are of inverse polarity, they no longer repel each other but attract due to their magnetic field relationship. Thus, welding in a confined space is facilitated.

By increasing the feed rate of the straight polarity electrode relative to that of the reverse polarity electrode, the ground current can be reduced to essentially zero. The electrical energy usually transmitted from the arcs to ground is utilized in melting the straight polarity electrode. By a relative increase of substantially 40 percent in the feed rate of the straight polarity electrode, the ground current is reduced to zero and the current in each arc is balanced. This results in the equivalent of a true series arc arrangement fed from separate current sources and free of problems due to arc blow and variation in the length and direction of the ground current path.

As a corollary, it has been found advantageous to have the reverse polarity electrode lead the straight polarity electrode along the seam by a slight amount, as the straight polarity electrode operates more efficiently with some preheat supplied from the reverse polarity electrode.

The panel fabrication apparatus includes a plurality of substantially parallel transversely extending supports having laterally spaced semi-circular recesses in their upper edges separated by short horizontal planar surfaces. The recesses in the several supports are aligned horizontally and serve to position the tubes for welding. The webs or spacer strips are set between adjacent tubes on the longitudinally aligned short horizontal surfaces. At least alternate supports are provided with tube clamping means comprising bars pivotally mounted adjacent one end of the supports and swingable in the vertical plane of the associated support. These bars can thus be swung into engagement with the upper surfaces of the tubes on the supports and have their free ends releasably latched to hold the bars in tube clamping position.

The welding apparatus is mounted on a cantilever support moving along guide rails parallel to the length of the panel. As the welding head approaches a clamp, the latter is unlatched to swing upward out of the way, such swing being effected by counterweights or by fluid pressure actuators. After passage of the welding head, the clamp is re-engaged with the tubes and re-latched.

In the welding sequence, the centermost web is first simultaneously welded to the tubes on either side thereof. Next, a web immediately to one side of the centermost web is similarly welded at each side to its adjacent tubes. The operation is then repeated with the web immediately to the other side of the centermost web, so that tubes and spacer strips are added alternately to opposite sides of the panel. This preferred sequence minimizes sidewise distortion of the panel.

When all the welds on the surface of the panel are completed, the panel is turned over and the welding sequence repeated on the other surface of the panel. During the welding sequence, the welded seams are interrupted at any position where an opening is to be provided in the panel for burner ports, soot blowers, or the like.

As a further novel feature of the invention, all the welding may be effected from only one side of the panel with thorough fusion of the side edges of each web to the adjacent tube walls. In accordance with this feature, each of the webs is supported between adjacent tubes upon an elongated copper or brass backing bar whose upper corner edges are spaced very slightly from the surface of adjacent tubes and preferably rounded. The side edges of the webs are also slightly spaced from the tube surfaces.

The welding is effected utilizing a submerged arc type of granular flux which fuses into a liquid under the flow of the welding current. This flux is of such a fineness that it sifts downwardly through the gaps between the tube surfaces and the edges of the web and backing bar. It has been found that using a finer submerged arc granular welding flux in the size range of 30 x 150 mesh to 50 x 150 mesh, and preferably 40 x 150 mesh, permits welding speeds of 72 inches per minute or better. Optimum results are attained with the 40 x 150 mesh flux. As the flux fuses, it forms upwardly convex meniscuses between each upper corner edge of the backing bar and the adjacent tube. The metal fused from the welding electrodes, the web, and the tube walls, solidifies in contact with the upper corner edges of the backing bar to form downwardly concave fillets between the edges of the webs and the tubes, the fusion penetrating completely through each side edge of the web. As a result, the sides edges of the web are united to the tube walls by thorough fusion therewith throughout the depth of the web, the joint being characterized by four fillets smoothly merging the web with the adjacent tube surfaces, and by the absence of any crack promoting notches or crevices.

For an understanding of the invention principles, reference is made to the following description of typical embodiments thereof as illustrated in the accompanying drawings. In the drawings.

Figure 1:
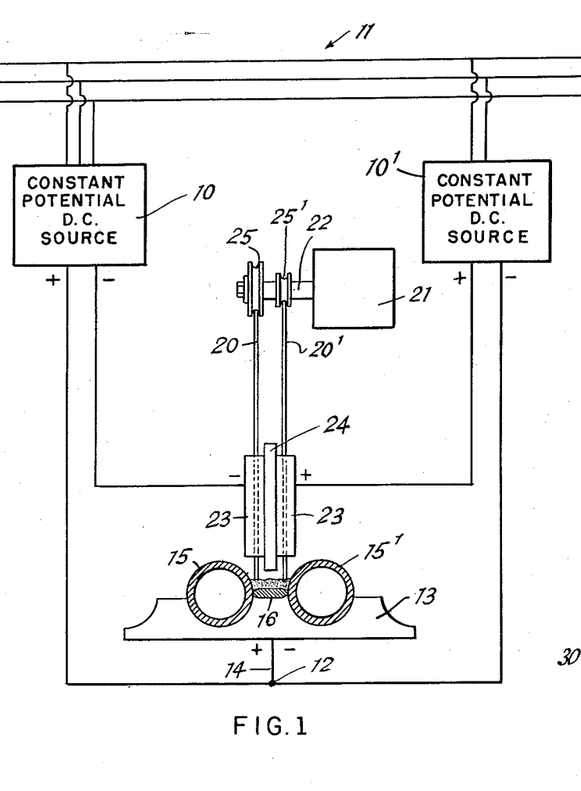
FIG. 1 is a schematic front elevation view of welding apparatus utilized in the invention, the workpieces being shown in section.
Figures 2, 2A:
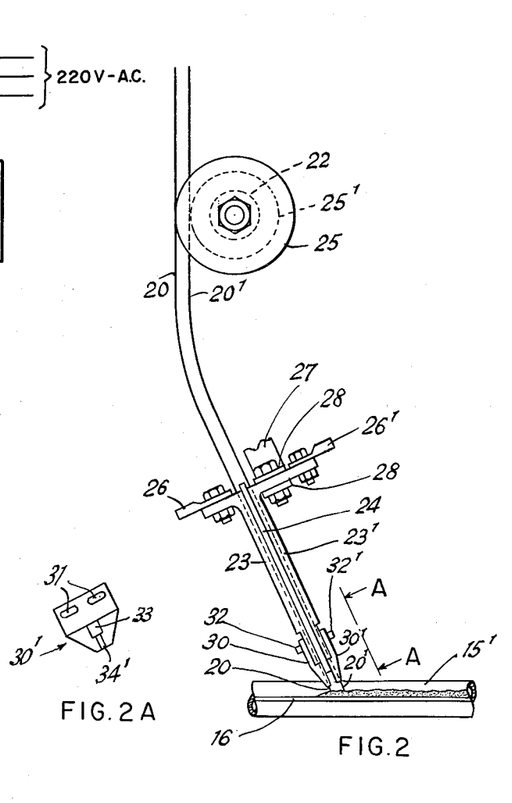
FIG. 2 is a partial side view of one form of the apparatus.
FIG. 2A is a view on the line A—A of FIG. 2.

FIGS. 1 through 6 illustrate the apparatus of said copending application, which is used in the present invention. Referring to FIGS. 1, 2 and 2A, the welding current is supplied from a pair of constant potential sources of direct current illustrated at 10 and 10'. In the illustrative example, these sources are three-phase rectifiers with their primary windings connected, in phase with each other, to a three-phase A.C. supply line 11. The positive terminal of source 10 and the negative terminal of source 10' are commonly connected to a junction 12 connected to work support or jig 13 by a ground conductor 14. The work is illustrated as a pair of metal tubes 15, 15' arranged to be welded to a metal web or spacer strip 16.

The weld beads joining each longitudinal edge of web 16 to tubes 15, 15' are deposited simultaneously from a pair of electrodes 20, 20' commonly driven from a single feed motor 21 driving a feed roll shaft 22 on which are secured feed rollers 25, 25' for electrodes 20, 20' respectively. The welding current is delivered to the electrodes by conductive metal contact shoes 23, 23' electrically insulated from each other by insulation 24. The current is conducted to shoes 23, 23' through terminals 26, 26' electrically connected thereto, and the shoes are supported by a bracket 27 mechanically connected to one contact shoe and electrically insulated therefrom as indicated at 28.

It will be noted that electrode 20 is connected to the negative output terminal of source 10, and that electrode 20' is connected to the positive output terminals of source 10'. Hence, electrode 20 is negative relative to the work, and electrode 20' is positive relative to the work. Accordingly, electrode 20 is connected in straight polarity and electrode 20' is connected in reverse polarity.

Feeding roller 25 is substantially larger in diameter than feeder roller 25'. Thus, the straight polarity electrode 20 has a feed rate substantially greater than that of the reverse polarity electrode 20'. In a specific example, if the diameter of roller 25 is 42 percent larger than the diameter of roller 25' the ground current is reduced to essentially zero.

As will be observed from FIG. 2, reverse polarity electrode 20' has a slight lead, in the direction of movement along the work, over straight polarity electrode 20. Contact shoes 23, 23' are provided with conductive metal electrode guide tips 30, 30', the latter being shown in FIG. 2A. The guide tips have slotted openings, such as 31', for receiving bolts 32, 32' securing the tips to the contact shoes, and are formed with openings, such as 33' to receive an electrode guide tube, and a passage, such as 34', for the electrode. The slotted openings provide for relative lateral adjustment of the guide tips to adjust the lateral spacing of electrodes 20, 20'.

The advantages of the described arrangement in reducing ground current will be recognized from the following. With reverse polarity electrode 20' operating at 460 amperes and straight polarity electrode 20 operating at 380 amperes, the measured ground current was 100 amperes. With both electrodes connected in reverse polarity and operating at 450 amperes, the measured ground current was equal to the sum of the electrode currents, or 900 amperes. In the first illustration, wherein the ground current was 100 amperes, the potential was 23 volts, thus representing 2300 watts. This 2300 watts was transferred to heat in the combined arcs by increasing the relative feeding rate of electrode 20 by substantially 40 percent, and the ground current was reduced to essentially zero.

FIGS. 3–6 illustrate the actual welding apparatus used, in which the welding head is mounted on a column having a vertical floating mounting on a carriage which has a horizontal floating mounting laterally of the tube panel. The support for this carriage is mounted on a main carriage travelling along guide rails at one side of and parallel to the positioning and support structure for the tubes and webs.

More specifically, a welding head 40, which is fundamentally similar to that illustrated schematically in FIGS. 1, 2 and 2A is adjustably supported on a split collar 41 clamped on the lower reduced end 42 of a vertical column 45 telescoped, for floating movement in a vertical direction, in a sleeve 50. A bearing 43 is interposed between column 45 and sleeve 50.

Figure 3:
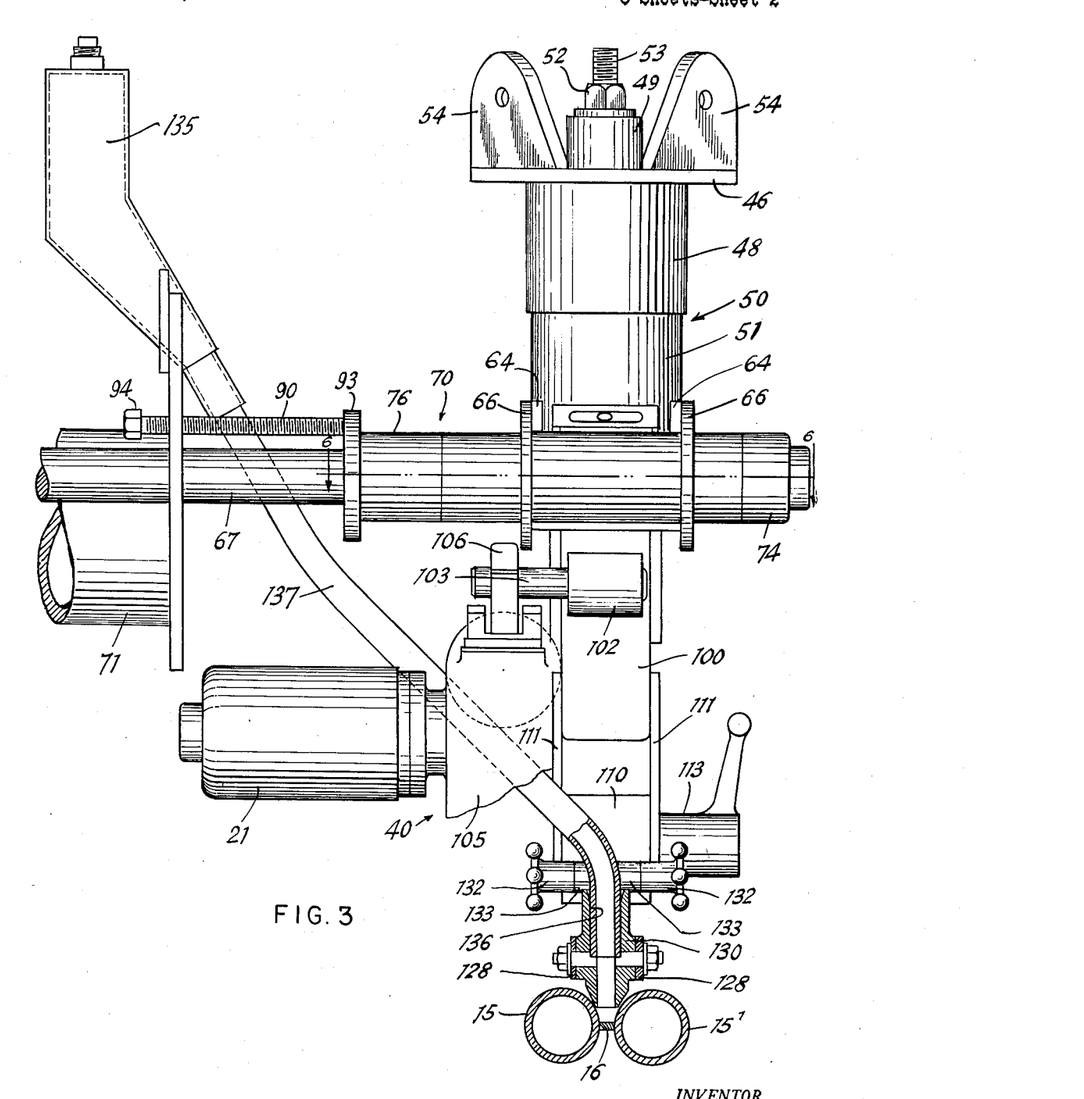
FIG. 3 is a front elevational view of an embodiment of the apparatus actually used in practicing the invention.
Figure 4:
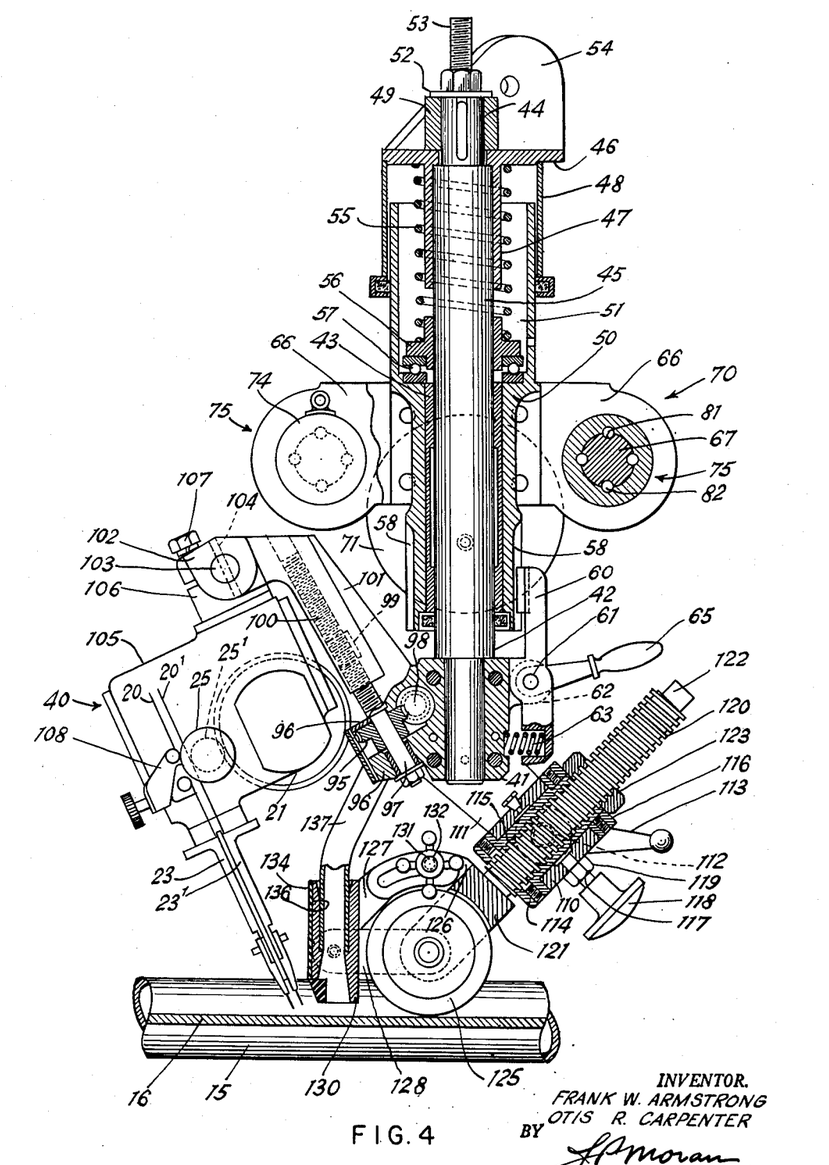
FIG. 4 is a side elevation view, partly in section, of the apparatus of FIG. 3.

The upper end of column 45 is reduced, as at 44, to form a shoulder seating a cap 46 having a tubular axial extension 47 telescoped over column 45. A cylindrical skirt 48 is welded to cap 46 and encloses the enlarged upper end 51 of sleeve 50. Cap 46 is secured on column 45 by means of a collar 49 welded to cap 46 and held in place on column end 44 by a nut and washer assembly 52 on the threaded extension 53 of reduced upper end 44. Ears 54 on cap 46 support reels (not shown) for the wire electrodes 20, 20'.

Cap 46, and thus column 45, are supported in sleeve 50 by means of a coil spring 55 embracing extension 47 and seating on a spring seat 56 supported on a roller bearing 57 supported on a shoulder formed at the junction of enlarged part 51 of sleeve 50 and the lower part of the sleeve.

The outer surface of the lower end of sleeve 50 is formed with a pair of diametrically opposite longitudinally extending grooves 58 which are engageable by the upper end of a latch lever 60 secured intermediate its ends to a shaft 61 pivoted in a pair of ears 62 projecting from split collar 41. A coil spring 63 is seated in the lower end of latch lever 60 and in collar 41 to bias lever 60 to the locking position. An operating handle 65 is secured to one end of shaft 61 to operate lever 60 to the unlatched position, and handle 65 may conveniently be duplicated at the opposite end of shaft 61. By unlatching lever 60, collar 41 and column 45 may be turned 180 degrees about the column axis to reverse the position of welding head 40 and its associated parts relative to the position shown in FIG. 4.

Figure 5:
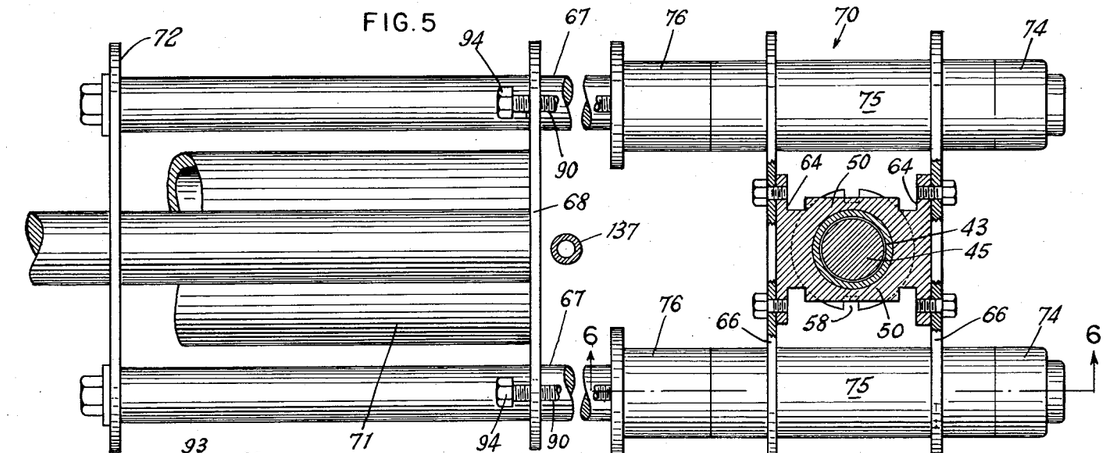
FIG. 5 is a plan view, partly in section, of a cantilever slide support for the apparatus of FIGS. 3 and 4.

As best seen in FIGS. 3 and 5, sleeve 50 is formed with flanged extensions 64, just below enlarged part 51 which are bolted to bridging members 66 forming part of a horizontally floating carriage generally indicated at 70. This carriage comprises a pair of sleeve assemblies 75 interconnected by members 66 and floating on a pair of rods 67 extending through a first plate 68 secured to the end of a horizontal boom 71 and secured in a second annular plate 72 secured on the boom and spaced substantially from plate 68. Boom 71 may be adjustably mounted on a carriage (not shown) arranged to travel parallel to a longer edge of the panel being fabricated.

Figure 6:
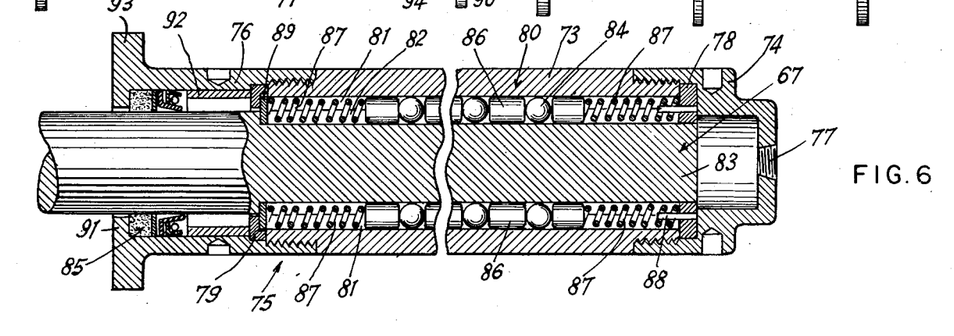
FIG. 6 is a longitudinal sectional view on the line 6—6 of FIG. 3.

Each sleeve assembly 75, as best seen in FIG. 6, includes a sleeve 73 having reduced threaded ends on which are screwed an end cap 74 and a dust seal cap 76, respectively. Cap 74 has a breather opening 77 and is shouldered to clamp an annular collar 78 against the outer end of sleeve 73. Similarly, dust seal cap 76 is shouldered to clamp an angular cross-section collar 79 against the inner end of sleeve 73.

Sleeve 73 is formed with a plurality, preferably four, of longitudinally extending semi-cylindrical grooves 81 in its inner surface which mate with corresponding grooves 82 in the outer surface of rod 67 within sleeve 73. The outer end of rod 67 is reduced in diameter, as at 83, beyond grooves 82 to the base diameter of the grooves 82, reduced end 83 having a clearance fit through collar 78. The grooves 81, 82 conjointly receive a bearing assembly 80 comprising bearing balls 84 separated by cylindrical spacers 86. Springs 87, also set into grooves 81, 82 engage each end of bearing assembly 80. The springs 87 at the outer end of the assembly seat over pins 88 projecting from collar 78. The springs at the inner end of the assembly seat against discs 89 engaging ring 79. An oil seal, generally indicated at 85, is held against a flange 91 on the inner end of sleeve 73, by a spacer 92 engaging ring 79.

Each sleeve 73 has a radial flange 93 on its inner end in which are threaded studs 90 extending freely through apertures in plate 68 and having heads 94 engageable with plate 68 to limit outward movement of carriage 75. Inward movement of the carriage is limited by the ends of rods 67 abutting end caps 74. The arrangement provides for carriage 75 to have a floating movement of a limited amount, such as 1", to either side of the centered position illustrated in the drawings.

The welding head 40 is adjustably mounted on split collar 41 for both lateral adjustment and adjustment of the angle of the electrodes 20, 20' relative to the work. Collar 41 has a pair of spaced apertured ears 96 projecting rearwardly and downwardly therefrom, and between these ears is a worm gear 95 secured to a shaft 97 extending through the apertures in the ears. A worm 98, operated by a suitable handle or knob (not shown), meshes with gear 95 to rotate this gear and shaft 97. Shaft 97 has a threaded upper end engaged in a nut 99 fixed to a slide 100 movably mounted on an upwardly and outwardly projecting extension 101 of collar 41. When worm 98 is turned, slide 100 will thus be moved longitudinally of extension 101. An apertured ear 102 extends from the upper end of slide 100 and receives a shaft 103 held therein against both rotation and axial movement by a pin 104.

Motor 21 drives the electrode feeding rollers 25, 25' through a gear reduction unit 105 on which the motor is mounted. Unit 105 has a split clamp 106 on its upper wall receiving shaft 103 and tightened by a stud 107. By loosening stud 107, clamp 106 and unit 105 can be rotated relative to shaft 103 and/or adjusted axially therealong, thus providing for angular and lateral adjustment of welding head 40 relative to the welding line or seam.

Electrodes 20, 20' are pressed against their respective feed rollers 25, 25' by pressure rollers mounted in an adjustable pressure roller unit 108 on gear unit 105. The electrodes then pass along contact shoes 23, 23' of the same general nature as those of FIGS. 1, 2 and 2A.

Side plates 111 are bolted to opposite surfaces of clamp 41 and extend forwardly and downwardly therefrom. A rectangular housing 110 is mounted between the outer ends of plates 111 by means of threaded studs 112 on housing 110 projecting through apertures in plates 111 and having handle operated nuts 113 threaded on their outer ends.

Housing 110 has a cylindrical bore extending transversely thereof and receiving an internally threaded sleeve 115 having a flange 114 on its lower end engaging housing 110. A collar 116 secured to the other end of sleeve 115 cooperates with flange 114 to retain sleeve 115 in the bore while permitting rotation of the sleeve. Sleeve 115 may be locked against rotation by a stud 117 operated by handle 118 and provided with a lock nut 119.

Sleeve 115 threadedly receives a threaded shaft 120 having a fork 121 on its lower end and a squared upper end 122. A lock nut 123 is provided on shaft 120. A guide wheel 125 is rotatably mounted in fork 121 to guide welding head 40 along the seam to be welded, movement of head 40 to follow wheel 125 being provided by the vertically floating column 45 and the horizontally and laterally floating carriage 70. Wheel 125 may be moved vertically by loosening stud 117 and rotating sleeve 115 by means of a wrench engaged in flange 114, provided lock nut 123 has been loosened. Wheel 125 may be angularly adjusted by loosening nut 113 and turning housing 110 about studs 112.

An arcuate slotted bracket 126 extends rearwardly from fork 121 in overlapping relation with a mating bracket 127 extending forwardly from a welding flux nozzle 130 which is also connected to the axle of guide wheel 125 by a pair of links 128. Studs 131 extend through the slots of brackets 126, 127 and are provided with nuts 132 engaging washers 133. By these means, the position of nozzle 130 relative to guide wheel 125 may be angularly adjusted.

The surface of flux nozzle 130 nearest to contact shoes 23, 23' is provided with dielectric insulating material, as at 134. Nozzle 130 has a passage 136, formed with a flared entrance, which removably seats the lower end of a flux conduit 137 extending from a flux hopper 135 mounted on annular plate 68.

As stated, the welding head 40 follows the variations in the seam to be welded by virtue of its lateral and vertical floating mounting permitting guide wheel 125 to move the head laterally or vertically with ease. The several adjustments provide for accurate centering of the head relative to the work. In addition, by removing conduit 137 from nozzle passage 136 and releasing latch 60, the apparatus may be turned 180 degrees to move along the seam in the opposite direction.

Referring to FIGS. 7–10, the supporting means 150, for positioning the tubes 15 and webs 16 during fabrication of the panel, comprises substantially parallel longitudinally extending beams 151 and laterally extending substantially parallel tube and web supports 152, 153 interchangeably supported on beams 151. Supports 152, 153 comprise elongated flat plates having semi-circular grooves 155 in their upper edges at uniformly spaced intervals therealong, grooves or scallops 155 being alternated with horizontal web support surfaces 160. The depth of grooves or notches 155 is so selected that, when tubes 15 are seated in notches 155 and webs 16 seated on surfaces 160, the webs will have the proper elevation relative to the common diametric plane of tubes 15. Preferably, the relations are such that webs 16 are just to one side of and preferably contiguous with such plane. The supports 152, 153 may be interchanged with other similar supports in accordance with the size of the tubes in the panel and the desired spacing of the tubes.

Figure 7:
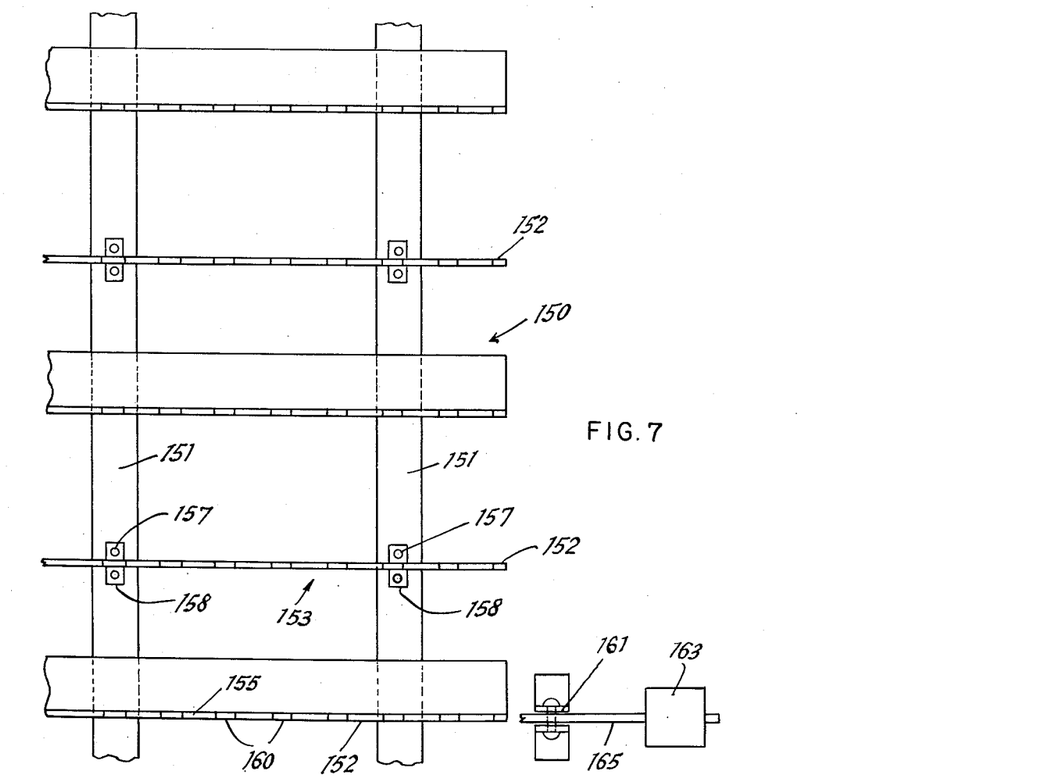
FIG. 7 is a partial plan view of the tube and web supporting means.
Figure 8:
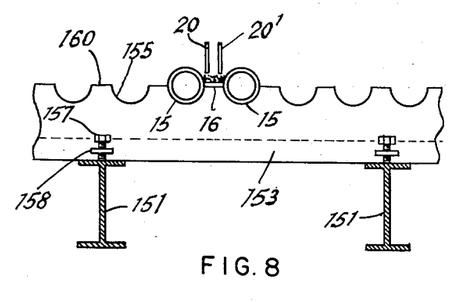
FIG. 8 is a partial end elevation view of the latter.
Figure 9:
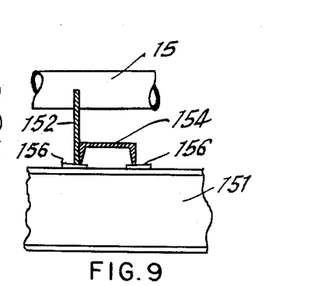
FIG. 9 is a partial side elevation view of the supporting means.

Supports 152 are welded or otherwise secured to inverted channels 154, whereas supports 153 are not so joined. Plumbing and leveling of supports 152 is effected by wedges 156, while plumbing and leveling of supports 153 is effected by studs or bolts 157 threaded through ears welded to supports 153 and bearing against beams 151. After such plumbing and leveling of the transverse supports, a plurality of tubes 15 are set into the longitudinally aligned notches 155 and webs 16 are placed between the tubes on the longitudinally aligned surfaces 160.

Figure 10:
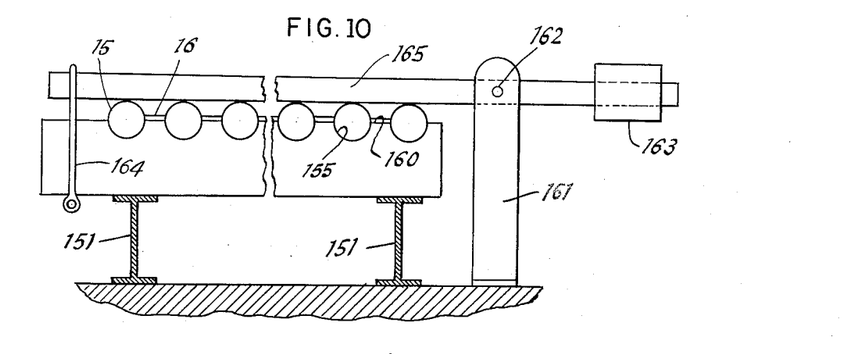
FIG. 10 is a view, similar to FIG. 8, illustrating the releasable clamping means.

Before the welding is started, the tubes 15 are clamped against supports 152 by the means more particularly illustrated in FIG. 10. As shown therein, upright posts 161 are provided along one side of support means or jig 150 each aligned with a support 152. A pivot 162 adjacent the upper end of each post supports an elongated clamping bar 165 having its longer end extending across the jig 150 in its clamping position. In the illustrated embodiment, the shorter ends of clamps 165 carry counterweights 163 which bias the clamping bars to an upright position. Clamps 165 are releasably held in the tube clamping substantially horizontal position by latch loops 164 pivotted to the opposite ends of supports 152 and engageable over the longer ends of the clamps.

After the tubes 15 and webs 16 are positioned on jig 150 and the tubes clamped against supports 152, the welding of the tubes and webs into an integrated panel is commenced. The welding head 40 is initially positioned in operative relation with the most central web 16 to fusion weld the edges of this web to the adjacent tubes 15. When this operation is completed, the welding head 40 is rotated 180 degrees and caused to travel in the opposite direction along one of the webs immediately on either side of the most central web to fusion weld the edges of such one web to the adjacent tubes. Then the welding head 40 is again rotated 180 degrees and positioned to travel along the other web immediately to one side of the most central web. This procedure of adding a tube and web alternately to opposite sides of the initial panel subunit is continued until all the tubes and webs have been joined together into the panel. The panel is then inverted and the welding procedure is repeated on the opposite side of the panel.

Figure 11:
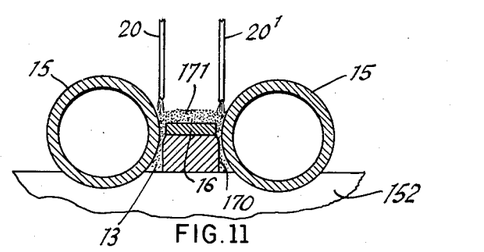
FIG. 11 is a transverse sectional view illustrating the means for forming the panel by welding from one side only thereof.
Figure 12:
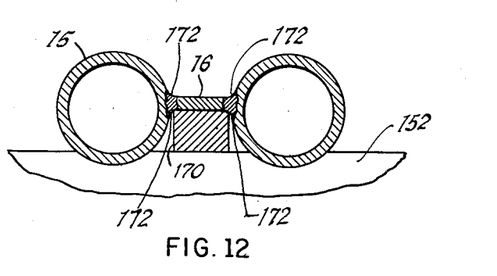
FIG. 12 is a similar view illustrating the completed seams.

However, by using the technique illustrated in FIGS. 11 and 12, all of the welding can be effected from one side of the panel. In this arrangement, the webs or spacer strips 16 are positioned on elongated copper bars 170 on the supports 152, 153. Bars 170 have a substantially rectangular cross-section with the two upper corner edges preferably rounded. Bars 170 are so positioned that these upper corner edges are closely adjacent the tube walls but definitely spaced therefrom to leave a very narrow gap. Web 16 has a width such that its side edges are spaced from the tube walls.

The welding is effected by the apparatus of FIGS. 1–6 using a granular submerged arc welding flux progressively deposited along the work. This flux 171 flows between the side edges of bar 16 and the tube walls, and a small amount sifts downwardly through the very narrow gaps between the tube walls and the upper corner edges of bar 170. Under the heat of the welding arc, the flux 171 becomes molten and meniscuses are formed spanning the gaps between the tube walls and the upper corner edges of copper or brass bar 170.

The coalesced molten metal of the tube walls, bar 16, and electrodes 20, 20' flows against these meniscuses and solidifies to form smooth fillets 172 between the lower part of bar 16 and the tube walls, the usual smooth fillets joining the upper surface of bar 16 to the tube walls being formed as before. Hence, thorough fusion welds are formed joining the entire depth of the side edges of bar 16 to the walls of tubes 15, these welds merging smoothly with the tube walls and the upper and lower surfaces of bar 16. There are crack or stress promoting notches and the welding operation is completed by welding from only one side of the panel. This greatly reduces the time required for welding the panel and the amount of handling required.

While specific embodiments of the invention have been shown and described in detail to illustrate the application of the invention principles, it will be understood that the invention may be embodied otherwise without departing from such principles.

What is claimed is:

1. The method of forming an integrated multiple tube panel composed of substantially parallel spaced metal tubes integrally united by metal webs interposed between the tubes, said method comprising the steps of arranging a plurality of relatively elongated metal tubes in spaced substantially parallel relation; disposing a relatively elongated metal web between each pair of tubes with its side edges substantially adjacent the tube surfaces to form therewith a pair of lines to be welded; juxtaposing each of a pair of fusible metal electrodes with a respective one of said lines; applying direct current potential between each electrode and the workpieces to establish arcs between each of said electrodes and the workpieces to fuse metal from the electrodes to coalesce with metal of the workpieces, with the welding heat of each electrode being applied directly to one of the tubes and to only the edge portion of the web adjacent such tube; conjointly feeding said electrodes toward such lines while conjointly advancing the electrodes along said lines and maintaining the tubes and webs in stationary positions to simultaneously form a pair of fusion welds independent of each other and each uniting a different one of a first pair of tubes to the adjacent edge of the web disposed therebetween; repeating the welding steps to fusion weld unite a second pair of tubes, including one of said first pair of tubes, to the adjacent edge of the web disposed therebetween; and continuing the welding steps to join all the tubes to the webs therebetween.

2. The method of forming an integrated multiple tube panel composed of substantially parallel spaced metal tubes integrally united by metal webs interposed between the tubes, said method comprising the steps of arranging a plurality of relatively elongated metal tubes in spaced substantially parallel relation; disposing a relatively elongated metal web between each pair of tubes with its side edges substantially adjacent the tube surfaces to form therewith a pair of lines to be welded; juxtaposing each of a pair of fusible metal electrodes with a respective one of said lines at an initial location extending substantially centrally longitudinally of the panel; applying direct current potential between each electrode and the workpieces to establish arcs between each of said electrodes and the workpieces to fuse metal from the electrodes to coalesce with metal of the workpieces, with the welding heat of each electrode being applied directly to one of the tubes and to only the edge portion of the web adjacent such tube; conjointly feeding said electrodes toward such lines while conjointly advancing the electrodes along said lines and maintaining the tubes and webs in stationary positions to simultaneously form a pair of fusion welds independent of each other and each uniting a different one of a first pair of tubes to the adjacent edge of the web disposed therebetween; repeating the welding steps to fusion weld unite a second pair of tubes, including one of said first pair of tubes, to the adjacent edge of the web disposed therebetween; repeating the welding steps to fusion weld unite a third pair of tubes, including the other of said first pair of tubes, to the adjacent edge of the web disposed therebetween; and continuing the welding steps to add tubes and webs alternately to each side of the panel.

3. The method of forming an integrated multiple tube panel composed of substantially parallel spaced metal tubes integrally united by metal webs interposed between the tubes, said method comprising the steps of arranging a plurality of relatively elongated metal tubes in spaced substantially parallel relation; disposing a relatively elongated metal web between each pair of tubes with its side edges substantially adjacent the tube surfaces to form therewith a pair of lines to be welded; depositing granular submerged arc type welding flux, having a fineness of from 30 x 150 mesh to 50 x 150 mesh, along the workpieces; juxtaposing each of a pair of fusible metal electrodes with a respective one of said lines; applying direct current potential between each electrode and the workpieces to establish arcs between each of said electrodes and the workpieces to fuse metal from the electrodes to coalesce with metal of the workpieces, with the welding heat of each electrode being applied directly to one of the tubes and to only the edge portion of the web adjacent such tube; conjointly feeding said electrodes toward such lines through the flux while conjointly advancing the electrodes along said lines and maintaining the tubes and webs in stationary positions to simultaneously form a pair of fusion welds independent of each other and each uniting a different one of a first pair of tubes to the adjacent edge of the web disposed therebetween; repeating the welding steps to fusion weld unite a second pair of tubes, including one of said first pair of tubes, to the adjacent edge of the web disposed therebetween; and when the fusion welds are completed on one surface of the panel, inverting the panel and performing the same sequence of fusion welding steps on the opposite surface of the panel.

4. The method of forming an integrated multiple tube panel composed of substantially parallel spaced metal tubes integrally united by metal webs interposed between the tubes, said method comprising the steps of arranging a plurality of relatively elongated metal tubes in spaced substantially parallel relation; disposing a relatively elongated metal web between each pair of tubes with its side edges substantially adjacent the tube surfaces to form therewith a pair of lines to be welded; depositing granular submerged arc type welding flux, having a fineness of the order of 40 x 150 mesh, along the workpieces; juxtaposing each of a pair of fusible metal electrodes with a respective one of said lines at an initial location extending substantially centrally longitudinally of the panel; juxtaposing each of a pair of fusible metal electrodes with a respective one of said lines at an initial location extending substantially centrally longitudinally of the panel; connecting the first electrode to the negative terminal of a first source of substantially constant direct current potential; connecting the second electrode to the positive terminal of a second source of substantially constant direct current potential; establishing arcs between each of said electrodes and the workpieces to fuse metal from the electrodes to coalesce with metal of the workpieces, with the welding heat of each electrode being applied directly to one of the tubes and to only the edge portion of the web adjacent such tube; conjointly feeding said electrodes toward such lines through the flux while conjointly advancing the electrodes along said lines and maintaining the tubes and webs in stationary positions to simultaneously form a pair of fusion welds independent of each other and each uniting a different one of a first pair of tubes to the adjacent edges of the web disposed therebetween; repeating the welding steps to fusion weld unite a second pair of tubes, including one of said first pair of tubes, to the adjacent edge of the web disposed therebetween; repeating the welding steps to fusion weld unite a second pair of tubes, including the other of said first pair of tubes, to the adjacent edge of the web disposed therebetween; and continuing the welding steps to add tubes and webs alternately to each side of the panel.

5. The method of forming an integrated multiple tube panel composed of substantially parallel spaced metal tubes integrally united by metal webs interposed between the tubes, said method comprising the steps of arranging at least a pair of relatively elongated metal tubes in spaced substantially parallel relation; disposing a relatively elongated bar of metal of high heat conductivity between the pair of tubes with its upper corner edges immediately adjacent but slightly spaced from the outer surfaces of said tubes to form a relatively narrow gap between each tube and said upper corner edges; positioning a relatively elongated metal web along the upper surface of said bar with its side edges spaced from the adjacent tubes to form welding lines; juxtaposing a fusible metal electrode with one of said lines; depositing granular submerged arc type welding flux on said web beneath the end of the electrode; establishing an arc between the end of the electrode and the workpieces and applying the welding heat along said one line directly to the corresponding adjacent tube and to only the edge portion of the web adjacent such tube; and conjointly feeding the electrode toward the workpieces, advancing the electrode along said one line, and continuing the deposition of the flux along said one line in advance of the electrode, to fuse metal from the electrode to coalesce with molten metal of said web edge and adjacent tube and to fuse said flux; the flux sifting through said relatively narrow gap and, when fused, forming a downwardly concave meniscus between the tube and the adjacent corner edge of the bar; the fused metal solidifying in contact with said meniscus to form a fillet weld smoothly merging with the lower corner edge of said web and the adjacent tube, a fusion weld merging with the side edge of said web and with the adjacent tube, and a fillet weld smoothly merging with the upper corner edge of said web and the adjacent tube.

6. The method of forming an integrated multiple tube panel composed of substantially parallel spaced metal tubes integrally united by metal webs interposed between the tubes, said method comprising the steps of arranging at least a pair of relatively elongated metal tubes in spaced substantially parallel relation; disposing a relatively elongated bar of metal of high heat conductivity, between the pair of tubes with its upper corner edges immediately adjacent but slightly spaced from the outer surfaces of said tubes to form a relatively narrow gap between each tube and said upper corner edges; positioning a relatively elongated metal web along the upper surface of said bar with its side edges spaced from the adjacent tubes to form welding lines; juxtaposing each of a pair of fusible metal electrodes with a respective one of said lines; depositing granular submerged arc type welding flux, having a fineness of from 30 x 150 mesh to 50 x 150 mesh, on said web beneath the ends of the electrodes; establishing an arc between the end of each electrode and the workpieces and applying the welding heat directly to the tubes and to only the edge portions of the web adjacent the tubes; and conjointly feeding the electrodes toward the workpieces, advancing the electrodes along said lines, and continuing the deposition of the flux along said web in advance of the electrodes, to fuse metal from the electrodes to coalesce with molten metal of said web edge portions and tubes and to fuse said flux; the flux sifting through said relatively narrow gaps and, when fused, forming a downwardly concave meniscus between each tube and the adjacent corner edge of the bar; the fused metal solidifying in contact with said meniscuses to form independent fillet welds smoothly merging with each lower corner edge of said web and the adjacent tube, independent fusion welds merging with each side edge of said web and with the adjacent tube, and independent fillet welds smoothly merging with each upper corner edge of said web and the adjacent tube.

7. The method of forming an integrated multiple tube panel composed of substantially parallel spaced metal tubes integrally united by metal webs interposed between the tubes, said method comprising the steps of arranging at least a pair of relatively elongated metal tubes in spaced substantially parallel relation; disposing a relatively elongated bar of metal of high heat conductivity between the pair of tubes with its upper corner edges immediately adjacent but slightly spaced from the outer surfaces of said tubes to form a relatively narrow gap between each tube and said upper corner edges; positioning a relatively elongated metal web along the upper surface of said bar with its side edges spaced from the adjacent tubes to form welding lines; juxtaposing each of a pair of fusible metal electrodes with a respective one of said lines; depositing granular submerged arc type welding flux having a fineness of from 30 x 150 mesh to 50 x 150 mesh, on said web beneath the ends of the electrodes; connecting the first electrode to the negative terminal of a first source of substantially constant direct current potential; connecting the second electrode to the positive terminal of a second source of substantially constant direct current potential; to establish an arc between the end of each electrode and the workpieces, with the welding heat being applied directly to the tubes and to only the edge portions of the web adjacent the tubes; and conjointly feeding the electrodes toward the workpieces, advancing the electrodes along said lines, and continuing the deposition of the flux along said web in advance of the electrodes, to fuse metal from the electrodes to coalesce with molten metal of said web edge portions and tubes and to fuse said flux; the flux sifting through said relatively narrow gaps and, when fused, forming a downwardly concave meniscus between each tube and the adjacent corner edge of the bar; the fused metal solidifying in contact with said meniscuses to form independent fillet welds smoothly merging with each lower corner edge of said web and the adjacent tube, independent fusion welds merging with each side edge of said web and with the adjacent tube, and independent fillet welds smoothly merging with each upper corner edge of said web and the adjacent tube.

References Cited in the file of this patent

UNITED STATES PATENTS

| | | |
|---|---|---|
| 1,612,317 | Reed | Dec. 28, 1926 |
| 1,655,930 | Woolard | Jan. 10, 1928 |
| 1,812,123 | Streasau | June 30, 1931 |
| 2,145,009 | Keir | Jan. 14, 1939 |
| 2,489,002 | Babbitt | Nov. 22, 1949 |
| 2,527,336 | Schaefer | Oct. 24, 1950 |
| 2,658,162 | Tichenor et al. | Nov. 3, 1953 |
| 2,719,210 | Chapman | Sept. 27, 1955 |
| 2,876,330 | Reinhardt | Mar. 3, 1959 |
| 2,886,694 | Kooistra | May 12, 1959 |
| 2,911,517 | Armstrong | Nov. 3, 1959 |